United States Patent
Heinz et al.

(10) Patent No.: US 11,111,831 B2
(45) Date of Patent: Sep. 7, 2021

(54) CYLINDER HEAD OIL SEPARATOR FOR AN INTERNAL COMBUSTION ENGINE (FLOW-CONTROLLED OIL SEPARATOR)

(71) Applicant: Montaplast GmbH, Morsbach (DE)

(72) Inventors: Michael Heinz, Neunkirchen (DE); René Pouillon, Engelskirchen (DE)

(73) Assignee: MONTAPLAST GMBH, Morsbach (DE)

( * ) Notice: Subject to any disclaimer, the term of this patent is extended or adjusted under 35 U.S.C. 154(b) by 0 days.

(21) Appl. No.: 16/629,819

(22) PCT Filed: Jul. 10, 2018

(86) PCT No.: PCT/EP2018/068651
§ 371 (c)(1),
(2) Date: Jan. 9, 2020

(87) PCT Pub. No.: WO2019/011910
PCT Pub. Date: Jan. 17, 2019

(65) Prior Publication Data
US 2021/0079821 A1 Mar. 18, 2021

(30) Foreign Application Priority Data
Jul. 12, 2017 (DE) ..................... 10 2017 115 682.8

(51) Int. Cl.
*F01M 13/04* (2006.01)
*B01D 45/06* (2006.01)
(Continued)

(52) U.S. Cl.
CPC ......... *F01M 13/0416* (2013.01); *B01D 45/06* (2013.01); *B01D 45/08* (2013.01);
(Continued)

(58) Field of Classification Search
CPC .. F01M 13/04; F01M 13/00; F01M 2011/023; F01M 2013/0066
See application file for complete search history.

(56) References Cited

U.S. PATENT DOCUMENTS

2007/0295315 A1* 12/2007 Guerry .................. F01M 13/04
123/572
2010/0307466 A1* 12/2010 Ruppel .................. F01M 13/04
123/573
(Continued)

FOREIGN PATENT DOCUMENTS

| DE | 39 10 559 A1 | 10/1990 |
|---|---|---|
| DE | 38 32 013 C2 | 8/1996 |

(Continued)

OTHER PUBLICATIONS

Int'l Search Report dated Oct. 11, 2018 in Int'l Application No. PCT/EP2018/068651.
(Continued)

*Primary Examiner* — Long T Tran
(74) *Attorney, Agent, or Firm* — Panitch Schwarze Belisaro & Nadel LLP (57) ABSTRACT

The invention relates to a cylinder head oil separator arranged in a cylinder head of an internal combustion engine. In order to reduce maintenance and simplify the oil separator, the cylinder head oil separator includes a flow channel which is constructed as a Tesla valve and which is designed such that the air-oil aerosol flows through a longer flow path in a first flow direction from the aerosol inlet at a first opening to the air outlet (separation direction) at a second opening. The air-oil aerosol flows through a shorter flow path in a ventilation direction opposite the separation direction from the inlet at the second opening to the outlet of a fluid at the first opening.

21 Claims, 5 Drawing Sheets

(51) Int. Cl.
  *B01D 45/08* (2006.01)
  *F01M 11/00* (2006.01)
  *F02F 1/24* (2006.01)
(52) U.S. Cl.
  CPC ............ *F01M 11/0004* (2013.01); *F02F 1/24* (2013.01); *F01M 2013/0461* (2013.01)

(56) References Cited

U.S. PATENT DOCUMENTS

| | | | |
|---|---|---|---|
| 2011/0174280 A1 | 7/2011 | Zimmermann et al. | |
| 2015/0059718 A1 | 3/2015 | Claywell et al. | |
| 2015/0337698 A1* | 11/2015 | Ruppel | B01D 46/543 |
| | | | 123/41.86 |
| 2016/0265404 A1* | 9/2016 | Fujii | F01M 13/0416 |
| 2019/0055865 A1* | 2/2019 | Nakamura | F01M 13/0011 |
| 2019/0153918 A1* | 5/2019 | Husband | F01M 13/04 |

FOREIGN PATENT DOCUMENTS

| | | |
|---|---|---|
| DE | 198 20 384 A1 | 11/1999 |
| DE | 10 2008 044 857 A1 | 8/2010 |
| DE | 10 2010 004 910 A1 | 7/2011 |
| DE | 20 2014 003 301 U1 | 5/2015 |
| DE | 10 2014 011 355 A1 | 2/2016 |
| DE | 10 2016 107 328 A1 | 10/2016 |
| EP | 2 146 061 A1 | 1/2010 |
| EP | 2 532 850 B1 | 12/2013 |

OTHER PUBLICATIONS

Int'l Preliminary Report on Patentability dated Sep. 10, 2019 in Int'l Application No. PCT/EP2018/068651.

* cited by examiner

CYLINDER HEAD OIL SEPARATOR FOR AN INTERNAL COMBUSTION ENGINE (FLOW-CONTROLLED OIL SEPARATOR)

CROSS-REFERENCE TO RELATED APPLICATIONS

This application is a Section 371 of International Application No. PCT/EP2018/068651, filed Jul. 10, 2018, which was published in the German language on Jan. 17, 2019, under International Publication No. WO 2019/011910 A1, which claims priority under 35 U.S.C. § 119(b) to German Application No. 10 2017 115 682.8, filed Jul. 12, 2017, the disclosures of which are incorporated herein by reference in its/their entirety.

BACKGROUND OF THE INVENTION

The invention concerns an apparatus for oil separation of a blowby gas (air-oil aerosol) discharged from a crankcase of an internal combustion engine, frequently also referred to as an oil separator for crankcase venting. The blowby gas typically comprises oil vapor, exhaust gas, unburnt fuel and/or water vapor. Crankcase venting is intended to maintain a slight negative pressure in the crankcase in order in that way for example to provide for optimum engine running and to comply with prevailing environmental protection requirements. The oil separated in the separator apparatus is passed back into the oil circuit. The remaining mixture of the blowby gas can be fed to the engine for combustion by way of the air intake side.

Such oil separators have long been known from the practice of engine construction. They usually include a diaphragm valve, also referred to as a pressure control valve abbreviated to PCV for controlling a slight negative pressure in the crankcase in order to prevent unwanted discharge of oil-loaded air into the environment. The blowby gas (air-oil aerosol) is fed to the oil separator by way of a feed line, separated from the oil in the oil separator, whereupon the separated oil passes back by way of a return line into the sump or into the crankcase. The air from which the oil has been removed, in part also referred to as "clean air", can then be fed to the induction air of the internal combustion engine again.

Such apparatuses for passive oil separation use the principle of inertial separation, in which the oil, by virtue of its mass inertia, is separated from the aerosol flow at at least one impact wall of the oil separator, by the heavier oil dropping down and the lighter air being deflected. Such oil separators are frequently also referred to as "inertial separators".

Inertial separators can for example be in the form of cyclone separators or impact separators, as is known for example from DE 10 2008 044 857 A1 to the present applicant. Such an impact separator includes a housing having an inlet opening for the incoming flow of the air-oil aerosol.

More specifically the invention concerns a cylinder head oil separator which can be arranged in a cylinder head of an internal combustion engine. The internal combustion engine accommodates in a cylinder at least one piston which is relatively moveable and which with a lower end of the piston drives a crankshaft mounted rotatably in a crankcase of the internal combustion engine. Provided beneath the crankshaft is an oil sump for collecting an oil. The cylinder head oil separator has a first opening for the feed of an air-oil aerosol which is fed by way of a feed line from the crankcase, an oil separation apparatus fluidically connected thereto for separation of the oil from the air-oil aerosol and a second opening adjoining the oil separation apparatus and fluidically connected thereto, and which is or can be fluidically connected to a return line for the return of an air from which the oil has been removed.

The state of the art is known from DE 10 2014 011 355 A1, EP 2 532 850 B1, DE 10 2010 004 910 A1, DE 198 20 384 A1, DE 39 10 559 A1 and DE 38 32 013 C2.

Although such cylinder head oil separators already implement highly satisfactory separation of the oil contained in the aerosol from the air they are of a complicated structure and have a large number of parts.

In certain engines additional venting of the crankcase is necessary, which is not possible with existing inertial separators (for example labyrinth separators) by virtue of the construction thereof so that a further component is required.

Taking that state of the art as the basic starting point the invention is concerned with the technical problem of at least partially overcoming those disadvantages and in particular providing an oil separator adapted for installation in a cylinder head of an internal combustion engine, which is of a simpler structure and has improved functionality and with which in particular also venting of the crankcase is to be effected as required.

BRIEF SUMMARY OF THE INVENTION

According to the invention that object is attained in a cylinder head oil separator of the kind set forth in the opening part of this specification and the claim features; advantageous but not obligatory further developments are recited in the appendant claims.

In the simplest configuration that object is therefore already attained in that the oil separation apparatus includes a flow passage which is so designed that an air-oil aerosol entering at the first opening in a separation direction (SR1) has to flow to an air outlet of the air cleaned of the oil at the second opening through a longer flow path than a fluid which flows in at the second opening and which flows to the first opening in a venting direction (SR2) opposite to the separation direction. The flow passage is of a geometrical configuration in the separation direction (SR1) to provide for flow-controlled oil separation.

The flow passage of the oil separation apparatus in the cylinder head oil separator, that is to say the flow passage communicating the first opening with the second opening in fluid relationship, is so designed that, in the flow direction from the aerosol inlet to the air outlet, which in accordance with the invention is referred to as the "separation direction", it is necessary to flow through a longer flow path, the flow passage in the separation direction is at least portion-wise of a geometrical configuration for implementing oil separation, and the flow passage at the same time is so designed that, in a flow direction which is opposite to the separation direction and which according to the invention is referred to as the "venting direction", an incoming fluid, in particular air, flows only through a shorter flow path.

The flow passage in that respect is so designed that in the "venting direction", a minimum possible deflection of the air flow takes place, that is to say a flow which is as laminar as possible is ensured, whereas in the opposite "separation direction", the passage is so designed that the air-oil aerosol has to flow through a markedly longer flow path in order only by means of inertial separation to provide the desired separation effect. According to the invention all portions of the flow passage both in the separation direction and also in the venting direction are connected to each other in flow relationship (fluidically).

Oil separation is thus effected solely by virtue of the configuration of the oil separation apparatus so that the oil separator manages completely without moveable parts in the form of springs, valves and can be integrated or installed in a greatly reduced structural space. In particular the oil separator is less liable to faults by virtue of the absence of seals so that it has a considerably longer service life than existing oil separators involving moveable parts.

With the cylinder head oil separator therefore, by means of a fluid flow, in particular an air flow, in the venting direction, it is possible for the first time with the same oil separator to also implement as required venting of the crankcase or other engine parts. As the air flows in the venting direction as linearly as possible along a central main passage there is a markedly lesser pressure drop than in the separation direction.

Preferably the cylinder head oil separator is adapted such that in the separation direction (SR1) from the intake of the air-oil aerosol at the first opening to the air outlet at the second opening, there is a greater pressure drop than when a fluid, in particular air, flows in the venting direction (SR2) in opposite relationship to the separation direction, through the same openings.

Preferably the flow passage is so designed that with an increasing volume flow the pressure in the separation direction falls more greatly than in the venting direction.

The flow passage of the cylinder head oil separator, which is designed in accordance with the Tesla principle, preferably includes a preferably substantially central main passage which extends from the first to the second opening and from which side passages fluidically connected to said main passage branch off at a plurality of branch locations and after deflection in the separation direction open downstream into the main passage again. Preferably the transition into a discharge portion of the side passage extends as linearly or as straight as possible at each branch location of a side passage from the main passage, whereas the main passage at the branch location simultaneously branches off somewhat laterally in the separation direction and then a reverse return portion of the side passage opens downstream of the branch location into the main passage again. In that way there can be a plurality of side passages at the main passage, in particular alternating in the separation direction at opposite sides of the main passage.

The flow resistance and thus the separation effect in the separation direction can be adapted as required by way of the configuration of the geometry and/or the number of side passages. For example side passages can be of different lengths, radii of curvature and dimensions in dependence on the respective engine power. In particular the width, height and cross-section can be matched to the respectively required air mass flow.

The provision of between 5 and 10 side passages has proven to be appropriate.

Particularly preferably the flow passage in the separation direction is between 1.5 and 5 times as great in length as in the venting direction. It is however also in accordance with the invention that the variation in the separation action is effected by way of the variation in the passage geometry and by way of combinations of the length and the passage geometry.

Preferred embodiments provide that each side passage includes a substantially linearly extending discharge portion, a deflection portion which is provided at the end thereof and which in particular is of an arcuate configuration and which preferably implements a deflection of the air-oil aerosol through 180 degrees, and a return portion which adjoins the deflection portion and which in turn opens into the main passage and preferably extends parallel to the discharge portion.

To reduce the structural space required in a housing for accommodating the oil separator it is desirable for the side passages to be inclined in the separation direction relative to the central longitudinal axis. Preferably the housing includes an upper housing portion or a housing cover which can be connected to a lower housing portion. Preferably the flow passage is provided at the lower housing portion which in addition can preferably be of a plate-shaped configuration or flat with a base plate and the flow passage are in the form of legs or walls which project up or down from said base plate.

Preferred embodiments include at least one side passage separator for increasing the separation effect. It is important that those measures for increasing the separation effect exert in the separation direction (SR1) no or only a slight influence on the flow configuration in the venting direction (SR2) along the central main passage. In that respect said separator(s) for increasing the separation effect are preferably provided in or at the side passages.

Those separators for increasing the separation effect can include for example constrictions which preferably extend transversely relative to the side passage or ribs extending within the side passage. Those ribs can for example be in the form of separation ribs having at least one portion extending transversely relative to the longitudinal direction in which the side passage extends. A ribbed or corrugated configuration of both or individual side walls of the side passage are also possible for increasing the separation effect.

Embodiments for increasing the separation effect in the side passage, preferably in the region of or adjoining the deflection portion, include an impact wall which extends substantially transversely relative to the flow direction and which is adapted to implement particularly strong or sharp deflection of the volume flow whereby the oil entrained in the aerosol is even better separated by virtue of the mass inertia at that impact wall.

Preferably the impact wall is at least portion-wise of a linear configuration.

Embodiments provide that the impact wall includes an acute angle of between about 70 and 85 degrees with an adjoining portion of the side passage, in particular an outside wall, in order in that way to achieve particularly sharp deflection and thus an improved separation effect.

An increase in the separation effect can also be achieved by the walls of the side passages having at least portion-wise and entirely an enlarged surface area, for example with ribs, corrugations of the like, whereby a larger surface area is afforded with the side passage being of the same length.

An increase in the separation effect in the flow passage can also be achieved by the provision of a device for increasing the flow speed. The arrangement of that flow speed-increasing device at the end of the main passage in the separation direction has proven to be particularly advantageous. By way of example that flow speed-increasing device can be in the form of a venturi nozzle, wherein the end of oil separation in the flow passage or a flow passage portion opens as a suction tube into the venturi nozzle.

Desirably the flow passage of that embodiment with the venturi nozzle is of a two-armed configuration, and therefore includes two flow passage portions opening into the venturi nozzle. Each of those flow passage portions can be designed in accordance with the invention, and therefore can include at least one main passage and at least one side passage. In that respect it can be provided that a flow passage portion has a flow therethrough only in the separation direction SR1 while the second flow passage portion has a flow therethrough only in the venting direction SR2 so that the flow passage with the venturi nozzle thus has 3 openings for the inlet and outlet of the media.

The various separators for increasing the separation effect can be combined with each other as desired for adapting the separation action to the respective engine properties/situations of use, that is to say either only in one side passage, in some or in all side passages.

The side passages can be of a differing configuration or a unitary configuration, that is to say designed with the same configuration, in which case the unitary configuration has proven to be particularly desirable.

The cylinder head oil separator preferably includes at least one oil discharge, preferably in the region of or below the at least one deflection portion of the side passage. It is however also possible for a plurality of oil discharges to be integrated in the housing of the cylinder head oil separator, for example at the lowest point of the housing. Alternatively the housing can be of an inclined design at one side or can be fitted in an inclined position, in which case the at least one oil discharge is then provided at the lowest point of the housing.

An embodiment which is particularly optimized in respect of structural space or geared to the requirements involved provides that the inlet and the outlet opening of the cylinder head oil separator extends at the same arc or half-arc from the inlet to the outlet opening. Upon integration in a housing therefore the openings for the air or air-aerosol feed are disposed at one side of the cylinder head oil separator.

The cylinder head oil separator can be designed to implement an optimized crank space pressure or crank space negative pressure in the negative range around −2 mbars in the crankcase. Preferably the cylinder head oil separator is so designed that the cylinder head oil separator provides from the first opening to the second opening in the separation direction a defined pressure reduction of in particular −2 mbars.

Preferably the side passages are provided at the main passage in alternately mutually displaced relationship along a longitudinal axis in the separation direction.

To reduce the required structural space it is desirable in that respect for the side passages to include an angle, in particular an acute angle of about 45 degrees, with the longitudinal axis of the cylinder head oil separator.

Preferably the plurality of side passages which are connected in succession in the separation direction are of the same configuration. It is however in accordance with the invention for the individual, above-described measures for increasing the separation effect in the side passages to be combined together as desired.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

In the specific description hereinafter reference is made to the accompanying drawings which form a part of this description of the invention and which for illustration purposes show specific embodiments with which the invention can be carried into effect. In this respect directional terminology like for example "upward", "downward", "forward", "rearward", "front", "rear" and so forth is used in relation to the orientations of the described Figure or Figures. As components of embodiments can be positioned in a number of differing orientations the directional terminology serves for illustration and is in no way limiting. It will be appreciated that other embodiments can be used and structural or logical modifications can be made without thereby departing from the scope of protection of the present invention. The following description is not to be interpreted in a limiting sense.

In the context of this description the terms "connected", "joined" and "integrated" are used to describe both a direct and also an indirect connection. Identical or similar components are denoted by identical references in the Figures insofar as that is desirable.

Reference numeral lines join the reference numeral to the part in question. An arrow in contrast which does not touch any part relates to an entire unit towards which it is directed. The Figures moreover are not necessarily true to scale. To illustrate details certain regions are possibly shown on an exaggeratedly large scale. In addition the drawings can be simplified for improved clarity and do not contain every detail which is possibly present in a practical configuration. The terms "upward" and "downward" relate to the view in the Figures.

Figure 1:
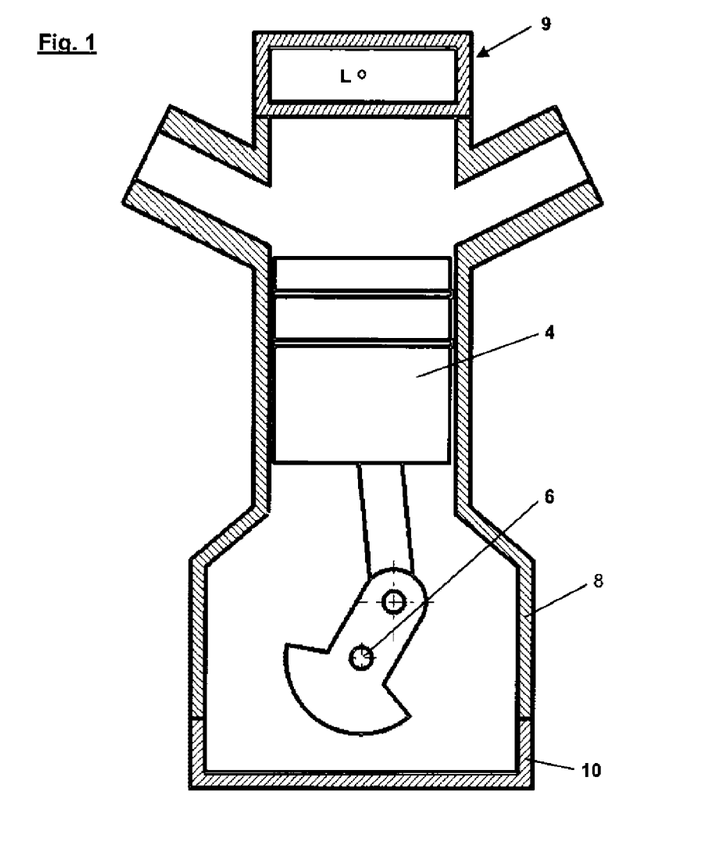
FIG. 1 shows a diagrammatic frontal sectional view of an internal combustion engine having a cylinder head oil separator according to the invention.

Referring to diagrammatically illustrated FIG. 1 the internal combustion engine substantially comprises an engine block 2 having a plurality of pistons 4 relatively moveable therein, each having a respective piston upper end and piston lower end. The pistons 4 are rotatably connected by way of connecting rods in known manner to a crankshaft 6 and drive it. Arranged beneath the crankshaft 6 accommodated in a crankcase 8 is a sump 10 for catching oil. The cylinder head oil separator inter alia is integrated into a cylinder head cover 9 which is in the form of a plastic injection molding, the cylinder head oil separator including a housing which has flow passages 12, 14, 16, 18, 20, 22 provided therein.

Different configurations of those flow passages 12, 14, 16, 18, 20, 22 which are integrated in the cylinder head oil separator and which are each in the form of Tesla valves are shown in diagrammatic plan views in FIGS. 2 through 8, which respectively extend in the viewing direction of FIG. 1 in the cylinder head oil separator along its longitudinal axis L.

Each flow passages 12, 14, 16, 18, 20, 22 includes a central main passage 12.1, 14.1, 16.1, 18.1, 20.1, 22.1 which extends from a first opening (inlet opening) to a second opening (outlet opening) of the oil separation apparatus, and from which there branch off a plurality of side passages 12.2, 14.2, 16.2, 18.2, 20.2, 22.2 which are fluidically connected thereto and of which only a respective one is described in greater detail in relation to each Figure.

Each of those flow passages 12, 14, 16, 18, 20, 22 is of such a configuration that a volume flow entering at a respective first opening along a respective arrow SR1 (the flow is respectively shown as a broken line) has to flow through the plurality of successively connected side passages 12.2, 14.2, 16.2, 18.2, 20.2, 22.2 extending from the respective central main passage 12.1, 14.1, 16.1, 18.1, 20.1, 22.1 at an acute angle relative to the respective longitudinal axis L with the air-oil aerosol to the second opening whereby inertial separation by separation of the oil from the air-oil aerosol is implemented by positive deflection in those side passages 12.2, 14.2, 16.2, 18.2, 20.2, 22.2.

In the reverse flow direction, that is to say in the venting direction along a volume flow now entering at the respective second opening along the respective arrow SR2 (the volume flow is respectively shown as a solid black line) in contrast, the flow passes to the respective first opening only through the respective substantially centrally disposed main passage 12.1, 14.1, 16.1, 18.1, 20.1 and 22.1. In that case the fluid, preferably air, flows through a markedly shorter flow path and there is a lesser pressure loss than in the opposite separation direction.

Figure 2:
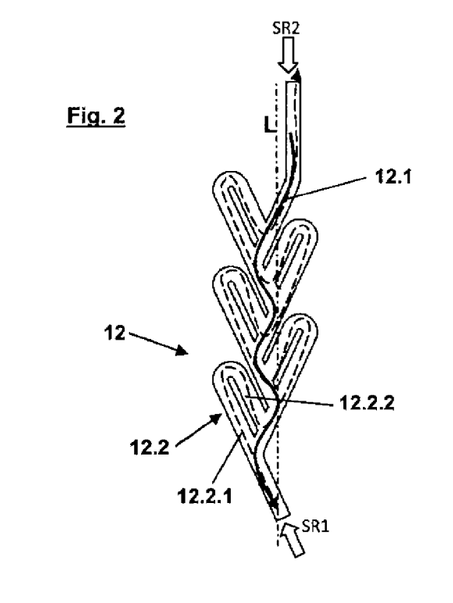
FIG. 2 shows a diagrammatic plan view of a first embodiment of a flow passage of the cylinder head oil separator.

In the first embodiment of the flow passage 12 shown in FIG. 2 the connection of the side passages is respectively in the form of an arcuate configuration with a deflection through 180 degrees. Each flow passage 12 includes a discharge portion 12.2.1 which is of a linear configuration and is connected to the main passage 12.1, at the end of which deflection through 180 degrees occurs and which then extends into an again linear discharge portion 12.2.2 which in turn opens again into the central main passage 12.1, more specifically extending parallel to the discharge portion 12.2.1. In that way there are a total of 5 successive side passages 12.2 provided alternately laterally on the main passage 12.1 in the separation direction, which in a manner to optimize structural space are respectively inclined at an acute angle relative to the longitudinal axis. Preferably that angle of inclination is about 45 degrees.

Figure 3:
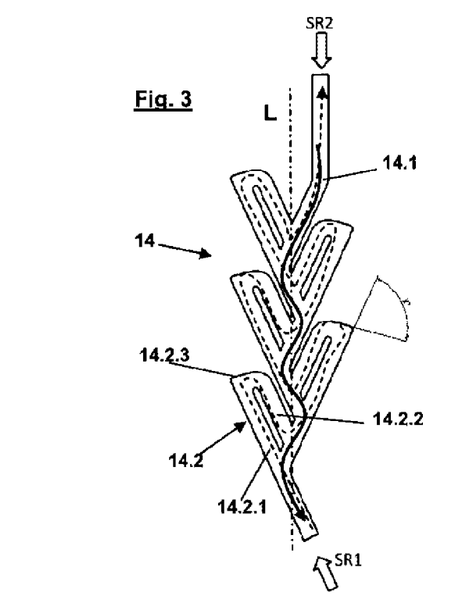
FIG. 3 shows a diagrammatic plan view of a second embodiment of a flow passage of the cylinder head oil separator.

In the second embodiment shown in FIG. 3 in addition there are a total of 5 successively disposed side passages 14.2 in the separation direction SR1, but here the configuration of the deflection arrangement is different. It is not of an exclusively harmonically arcuate configuration, but again has a linear discharge portion 14.2.1 which extends from the main passage 14.1 and which at its end goes into an impact wall 14.2.3 which extends transversely relative to the longitudinal axis of the discharge portion 14.2.1 and which is firstly straight and which includes an acute angle with the outside wall of the discharge portion 14.2.1 and then goes by way of a harmonic arcuate portion into the return portion 14.2.2 which in turn opens in parallel displaced relationship with the discharge portion 14.2.1 into the central main passage 14.1.

Figure 4:
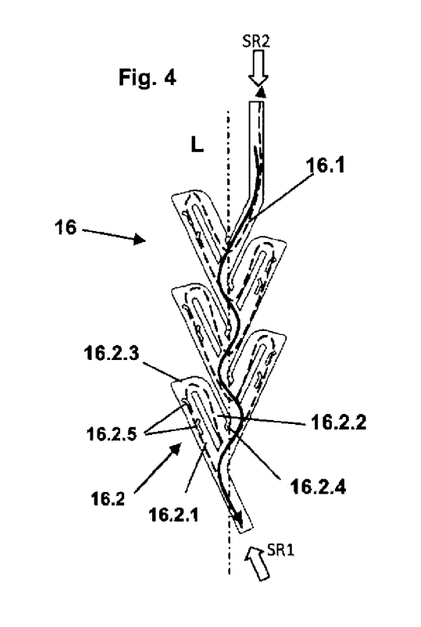
FIG. 4 shows a diagrammatic plan view of a third embodiment of a flow passage of the cylinder head oil separator.

The third embodiment shown in FIG. 4 corresponds to that in FIG. 3 with the difference that provided in the respective discharge portions 16.2.1 of a side passage 16.2 are separation ribs 16.2.5 which represent an interference geometry and which have longitudinal limbs which extend substantially in the longitudinal direction of the passage, with an angular extension at the end, extending transversely relative to that longitudinal limb. Besides the configuration of such separation ribs 16.2.5 in the discharge portion 16.2.1 they can additionally or alternatively also be provided in the return portion 16.2.2 of each side passage 12.2, 14.2, 16.2, 18.2, 20.2, 22.2.

Figure 5:
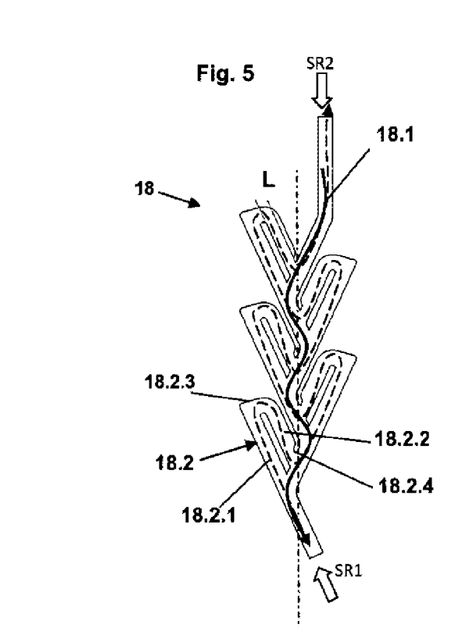
FIG. 5 shows a diagrammatic plan view of a fourth embodiment of a flow passage of the cylinder head oil separator.

The third embodiment of FIG. 4 and the fourth embodiment of FIG. 5 also include, at the deflections of the side passages 16.2 and 18.2, respective impact walls 16.2.3 and 18.2.3 for increasing the separation effect.

In addition those return portions 16.2.2 and 18.2.2 shown in FIGS. 4 and 5 for increasing the separation effect also have at their ends at the transition into the main passage 16.1, 18.1 a respective inwardly projecting constriction 16.2.4, 18.2.4 which extend approximately half into the cross-section of the return portion 16.2.2 and 18.2.2 and reduce that cross-section approximately by a third.

Figure 6:
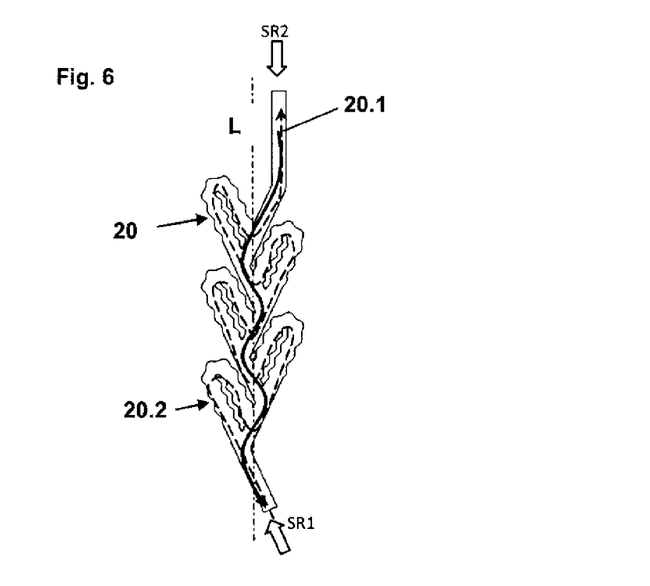
FIG. 6 shows a diagrammatic plan view of a fifth embodiment of a flow passage of the cylinder head oil separator.

The fifth embodiment shown in FIG. 6 substantially corresponds to the first embodiment shown in FIG. 2, but differs therefrom in that the inside and outside walls of the side passages 20.2 are of a corrugated configuration to increase the separation effect.

Figure 7:
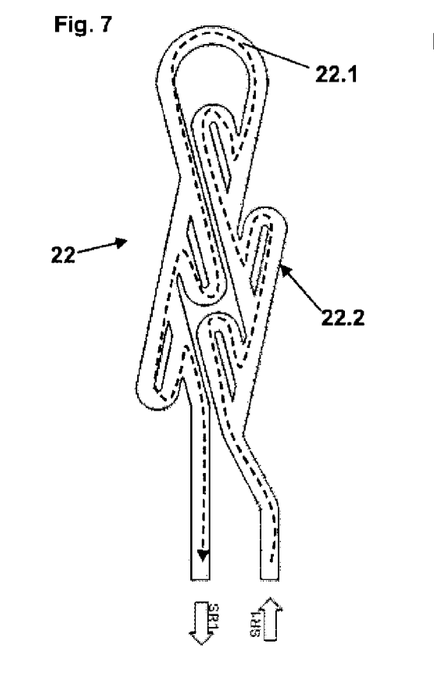
FIG. 7 shows a diagrammatic plan view of a sixth embodiment of a flow passage of the cylinder head oil separator with a through flow in the separation direction.
Figure 8:
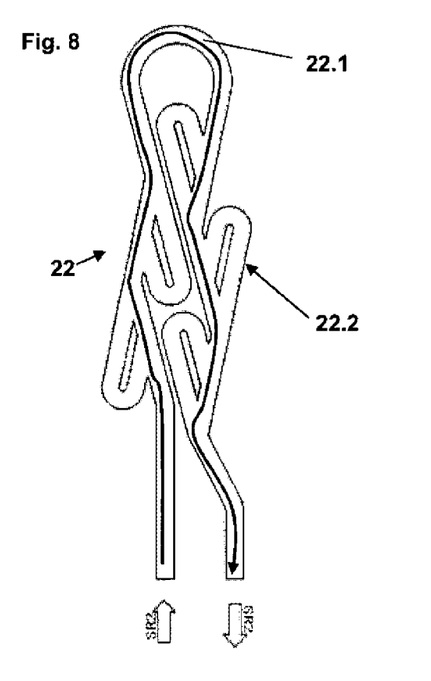
FIG. 8 shows the embodiment of FIG. 7 with a through flow in the venting direction.

The embodiment of FIGS. 7 and 8 illustrates a configuration which is optimized in respect of structural space, in which the inlet side or the first opening of the flow passage 22 of the cylinder head oil separator and the outlet side or the second opening are arranged at a common end, here the lower end, and the central main passage 22.1 is therefore not of a substantially linear configuration in the longitudinal direction, but is basically curved in an arcuate configuration through 180 degree with angle portions and then the total of 5 side passages 22.2 depart therefrom.

Figure 9:
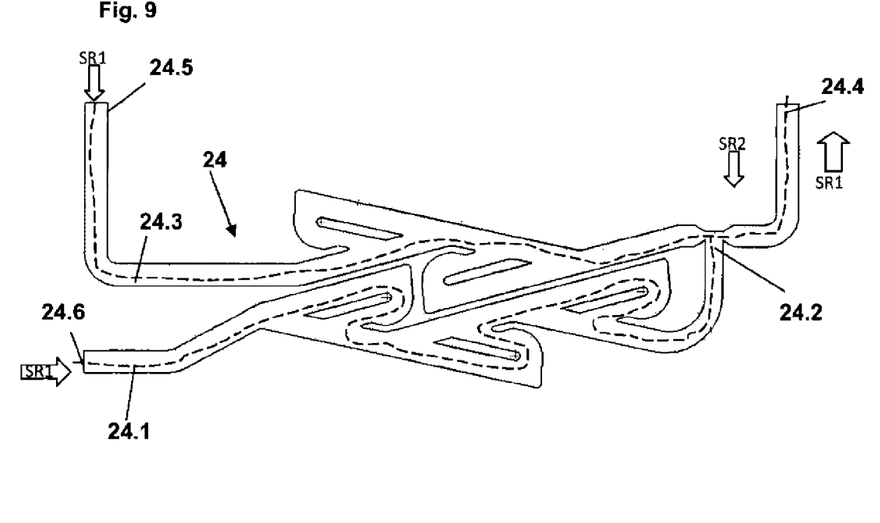
FIG. 9 shows a diagrammatic plan view of a seventh embodiment of a flow passage of the cylinder head oil separator.

The seventh embodiment shown in FIG. 9 of the cylinder head oil separator includes a flow passage 24 having two flow passage portions, of which a first flow passage portion 24.1 opens axially along the main flow direction into a venturi nozzle 24.2 and the second flow passage portion 24.3 forms radially laterally the discharge tube of the venturi nozzle 24.2. The venturi nozzle 24.2 is therefore arranged at the end of the flow passage portions 24.1, 24.3 in the separation direction SR1. That venturi nozzle 24.2 increases the pressure difference between the venturi nozzle 24.2 and the first flow passage portion 24.1 and thus increases the separation effect in the separation direction SR1.

The venturi nozzle 24.2 can be provided either on its own or in combination with other measures for increasing the separation effect.

In contrast to the previous embodiment that flow passage 24 includes in total three openings, namely a first opening 24.4 disposed at the right side downstream of the venturi nozzle 24.2 and on the left side two separate openings 24.5, 24.6, wherein adjoining the second opening 24.5 is the first flow passage portion 24.1 which has a main passage with three side passages and which opens radially as a discharge tube into the venturi nozzle 24.2. The second flow passage portion 24.3 includes a main passage with two side passages and opens axially in the main flow direction into the venturi nozzle 24.2 so that it forms the control passage for the venturi nozzle 24.2. In that second flow passage portion 24.3 the side passages function as check valves to prevent a flow passing into the first opening 24.4 through the venturi nozzle 24.2. Insofar as venting in the venting direction SR2 is wanted it is possible to dispense with the side passages in the second flow passage portion 24.3.

The opening 24.5 forms the inlet opening for the fluid driving the venturi nozzle 24.2, and therefore flows axially in the venturi nozzle 24.2 and issues through the opening 24.4.

The opening 24.6 at the beginning of the first flow passage portion 24.1 in contrast forms the separate aerosol inlet through which the loaded air-oil aerosol enters in the separation direction SR1 and wherein the cleaned air issues by way of the first opening 24.4.

Figure 10:
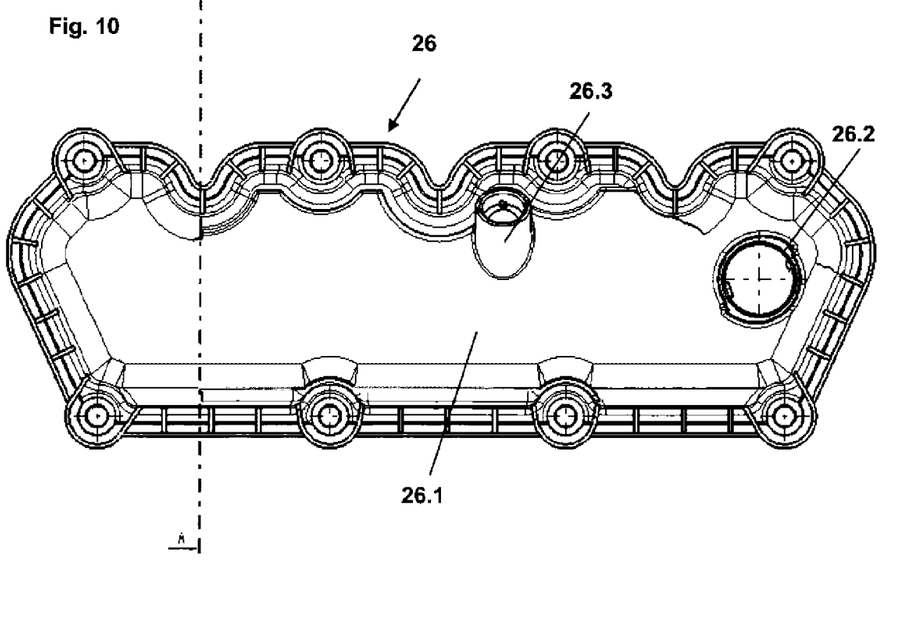
FIG. 10 shows a plan view of a cylinder head cover with integrated cylinder head oil separator.
Figure 11:
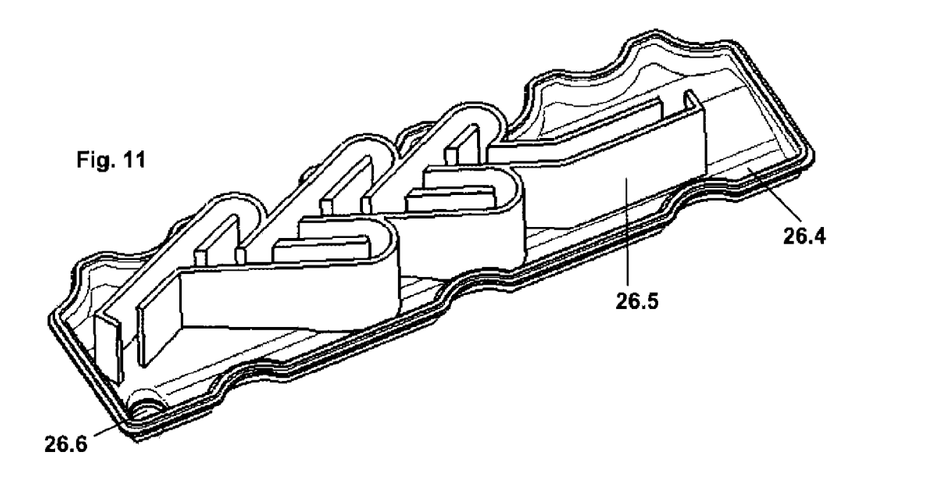
FIG. 11 shows an isometric front view of the cylinder head cover with cap removed.
Figure 12:
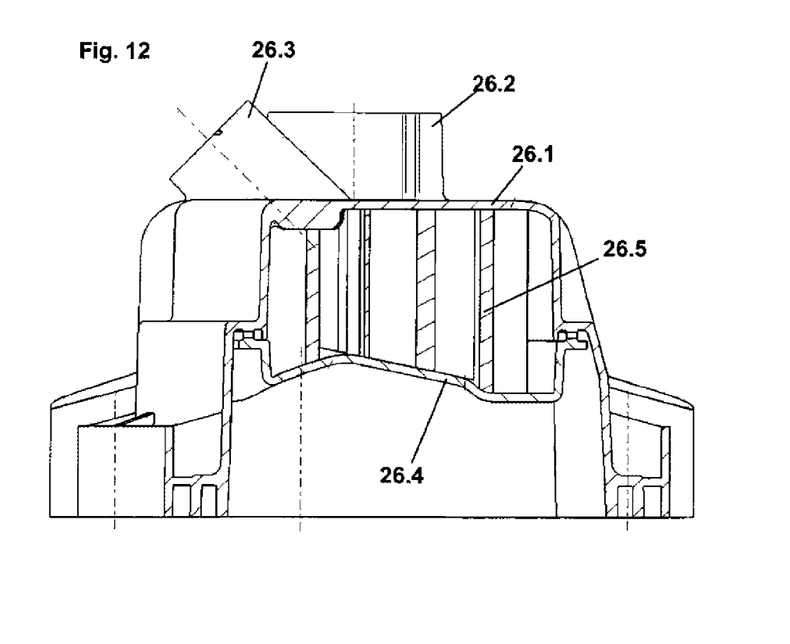
FIG. 12 shows an enlarged cross-section along line A-A in FIG. 9 of the cylinder head cover shown in FIG. 10.

FIGS. 10 through 12 then show configurations of a cylinder head cover 26 designed in accordance with the invention, with integrated oil separator.

FIG. 10 shows a plan view of that cylinder head cover 26 which can be fixed on the top side of an engine block by way of a plurality of fixing eyes which are provided at the edges and which are provided on each side along the longitudinal direction in which the cylinder head cover 26 extends. The cylinder head cover 26 includes a cover member 26.1 which is curved in a dome or hood-like configuration and into which extends vertically at one end from above an oil filling connection 26.2 and somewhat inclinedly laterally therefrom at an angle relative to the side an air outlet opening 26.3 through which the cleaned air issues.

In accordance with the enlarged cross-section in FIG. 12 in the installation position the cover member 26.1 is connected at its peripheral edge to a plate-like shell 26.4, the two components being for example welded or glued together. Walls 26.5 for forming the flow passage are integrally formed on a top side of the plate-like shell 26.4. Thus in the assembled state of the cylinder head cover 26 including the cover member 26.1 and the shell 26.4 the flow passage is formed between those two parts, the cover member 26.1 covering over and closing the flow passage on the top side.

In FIG. 11 provided at the end which is the front end at the right side is an aerosol inlet opening 26.6 through which therefore the oil-loaded air passes, flows through the flow passage and then issues through the air outlet opening 26.3 at the end of the flow passage.

The man skilled in the art will appreciate that the invention is not restricted to 5 side passages, but there can be any number of side passages suited to the respective situation of use.

The man skilled in the art will also appreciate that the configuration shown in FIG. 7 can be combined with further devices for increasing the flow path in the separation direction in individual or all side passages, for example with the constrictions 16.2.4, 18.2.4 of the third embodiment of FIG. 4 or the fourth embodiment of FIG. 5, the separation ribs 16.2.5 in the third embodiment in FIG. 4 or the corrugated walls of the side passages in the fifth embodiment of FIG. 6.

The concept of integration of a Tesla flow valve was described in the installation situation of being fitted in a cylinder head. It will however be appreciated by the man skilled in the art that according to the invention this concept can be integrated in the engine at other locations. All features and details disclosed in the documents, in particular the spatial configuration shown in the drawings, are claimed as being essential to the invention insofar as they are novel individually or in combination over the state of the art.

We claim:

1. A cylinder head oil separator which is arranged in a cylinder head of an internal combustion engine, wherein the internal combustion engine accommodates in an engine block in relatively moveable relationship at least one piston which with a piston lower end drives a crankshaft mounted rotatably in a crankcase, wherein there is provided a sump arranged beneath the crankshaft for collecting an oil, wherein the cylinder head oil separator has a first opening for the feed of an air-oil aerosol fed by way of a feed line from the crankcase, an oil separation apparatus fluidically connected thereto for separation of the oil from the air-oil aerosol and a fluidically connected second opening which adjoins the oil separation apparatus and which can be connected in flow relationship to a return line for return of an air cleaned of the oil, wherein the oil separation apparatus includes a flow passage configured in the form of a Tesla flow valve, such that an air-oil aerosol entering at the first opening in a separation direction (SR1) to an air outlet of the air cleaned of the oil at a second opening flows through a longer flow path than a fluid which enters at the second opening and which flows to the first opening in a venting direction (SR2) in opposite relationship to the separation direction and the flow passage is of such a geometrical configuration in the separation direction (SR1) in order to implement flow-controlled oil separation.

2. A cylinder head oil separator as set forth in claim 1, wherein the flow passage is adapted to produce a greater pressure drop in the separation direction (SR1) than in the venting direction (SR2).

3. A cylinder head oil separator as set forth in claim 2, wherein the flow passage includes a nozzle.

4. A cylinder head oil separator as set forth in claim 3, wherein the nozzle is in the form of a venturi nozzle and at least one flow passage portion forms the suction tube of the venturi nozzle.

5. A cylinder head oil separator as set forth in claim 1, wherein the flow passage includes a main passage and a plurality of side passages branching off of the main passage in fluidically connected relationship with the main passage.

6. A cylinder head oil separator as set forth in claim 5, wherein the side passages respectively include a discharge portion extending from the main passage, an arcuate portion adjoining same and adapted for oil separation, and a return portion adjoining same and fluidically connected to the main passage.

7. A cylinder head oil separator as set forth in claim 6, wherein at least one of the discharge portion and the return portion are linear.

8. A cylinder head oil separator as set forth in claim 7, wherein at least one discharge portion and at least one return portion extend parallel to each other.

9. A cylinder head oil separator as set forth in claim 5, wherein the side passages are inclined in the separation direction and include an acute angle with a longitudinal axis (L) in the separation direction.

10. A cylinder head oil separator as set forth in claim 1, wherein it is integrated in a housing in the form of a plastic injection molding.

11. A cylinder head oil separator as set forth in claim 10, wherein it is integrated in a cylinder head cover.

12. An internal combustion engine comprising an engine block which relatively moveably accommodates at least one piston which drives a crankshaft mounted rotatably below same in a crankcase, wherein there is provided a sump arranged below the crankshaft for collecting an oil and wherein provided above the at least one piston in a cylinder head is a cylinder head oil separator, wherein the cylinder head oil separator is in accordance with claim 1.

13. A cylinder head oil separator which is arranged in a cylinder head of an internal combustion engine, wherein the internal combustion engine accommodates in an engine block in relatively moveable relationship at least one piston which with a piston lower end drives a crankshaft mounted rotatably in a crankcase, wherein there is provided a sump arranged beneath the crankshaft for collecting an oil, wherein the cylinder head oil separator has a first opening for the feed of an air-oil aerosol fed by way of a feed line from the crankcase, an oil separation apparatus fluidically connected thereto for separation of the oil from the air-oil aerosol and a fluidically connected second opening which adjoins the oil separation apparatus and which can be connected in flow relationship to a return line for return of an air cleaned of the oil, wherein the oil separation apparatus includes a flow passage in the form of a Tesla flow valve, such that an air-oil aerosol entering at the first opening in a separation direction (SR1) to an air outlet of the air cleaned of the oil at a second opening flows through a longer flow path than a fluid which enters at the second opening and which flows to the first opening in a venting direction (SR2) in opposite relationship to the separation direction and the flow passage is of such a geometrical configuration in the separation direction (SR1) in order to implement flow-controlled oil separation, wherein the flow passage includes a main passage and a plurality of side passages branching off of the main passage in fluidically connected relationship with the main passage, wherein the side passages respectively include a discharge portion extending from the main passage, an arcuate portion adjoining same and adapted for oil separation, and a return portion adjoining same and fluidically connected to the main passage, wherein at least one of the discharge portion and the return portion are linear, wherein at least one discharge portion and at least one return portion extend parallel to each other, and wherein at least one side passage has separators for increasing the separation effect.

14. A cylinder head oil separator as set forth in claim 13, wherein the separators for increasing the separation effect include an at least partially linear impact wall in the arcuate portion.

15. A cylinder head oil separator as set forth in claim 14, wherein the impact wall includes an acute angle between 70 and 85 degrees, with a wall of the discharge portion.

16. A cylinder head oil separator as set forth in claim 13, wherein the separators for increasing the separation effect include at least one corrugated wall at least one side passage.

17. A cylinder head oil separator as set forth in claim 13, wherein the separators for increasing the separation effect include at least one constriction.

18. A cylinder head oil separator as set forth in claim 17, wherein the at least one constriction is provided at the transition of at least one return portion to the main passage.

19. A cylinder head oil separator as set forth in claim 17, wherein the constriction extends into the cross-section of the return portion and reduces said cross-section approximately by a third.

20. A cylinder head oil separator as set forth in claim 13, wherein the separators for increasing the separation effect include at least one separation rib.

21. A cylinder head oil separator as set forth in claim 13, wherein the separators for increasing the separation effect include at least one side passage, at least one arcuate portion having an impact wall and/or at least one corrugated wall and/or at least one separation rib and/or at least one constriction.

\* \* \* \* \*